United States Patent [19]

Gaynor

[11] 3,970,002

[45] July 20, 1976

[54] IMAGE TRANSFER LAYERS FOR INFRARED TRANSFER PROCESSES

[75] Inventor: Joseph Gaynor, Arcadia, Calif.

[73] Assignee: Bell & Howell Company, Chicago, Ill.

[22] Filed: Feb. 7, 1973

[21] Appl. No.: 330,337

Related U.S. Application Data

[62] Division of Ser. No. 83,397, Oct. 23, 1970, Pat. No. 3,730,091.

[52] U.S. Cl. .................................................. 101/463

[51] Int. Cl.[2] ..................... B41M 5/02; G01N 21/34

[58] Field of Search .................................. 101/463

[56] References Cited

UNITED STATES PATENTS

| | | | |
|---|---|---|---|
| 2,688,649 | 9/1954 | Bjorksten | 101/450 X |
| 3,024,392 | 3/1962 | Baermann | 101/MV X |
| 3,078,183 | 2/1963 | Karalus | 101/382 MV X |
| 3,120,806 | 2/1964 | Supernowicz | 101/426 |
| 3,122,998 | 3/1964 | Raczynski et al. | 101/471 |
| 3,217,641 | 11/1965 | Goffredo | 101/401.1 X |
| 3,272,121 | 9/1966 | Uber et al. | 101/465 X |

*Primary Examiner*—Clyde I. Coughenour
*Attorney, Agent, or Firm*—Robert A. Walsh

[57] ABSTRACT

An improved image resolution in thermo-transfer duplicating processes is accomplished by means of dispersing a plurality of thermally conductive particles in the dye-wax layer of transfer material used in such processes and applying an electrical or magnetic field to the transfer material layer sufficient to orient and align the particles parallel to the direction of the field. In this way the improved dye-wax layer of transfer material is capable of greater thermal conductivity in the direction transverse to the layer than in the lateral direction of the layer.

7 Claims, 6 Drawing Figures

IMAGE TRANSFER LAYERS FOR INFRARED TRANSFER PROCESSES

This is a division of application Ser. No. 83,397, filed Oct. 23, 1970, now U.S. Pat. No. 3,730,091.

BACKGROUND OF THE INVENTION

This invention relates to the thermo-transfer processes used to make reproduction from image-containing originals by methods which effect the transfer of images directly onto copy sheets or which alternatively provide master duplicating sheets usable in solvent duplicating processes. More specifically, however, this invention relates to means for improving image resolution in various thermo-transfer processes.

In general, thermo-transfer processes are used in making both facsimile copies, i.e. single copies prepared directly from and to the size of an image-containing original, and duplication master sheets for later use in solvent, duplicating processes. A complete description of such thermo-transfer processes, the materials used therein and compositions of the thermal transfer layers can be found in U.S. Pat. Nos. 3,122,997 and 3,122,998 the entire disclosures of which are hereby incorporated by reference. In general, however, the thermo-transfer processes useful in preparing either facsimile copies or master sheets employ an original, carrying infrared radiation absorbing characters and designs, and a waxy dye-containing transfer material capable of responding to heat patterns generated on the original which correspond to the characters and designs imprinted thereon.

When infrared radiation absorbing characters carried on an original sheet are subjected to the controlled exposure of infrared radiation, a differential heat pattern is generated in the sheet so that the areas in the sheet corresponding to the infrared radiation absorbing characters are elevated to high temperatures relative to the rather lower temperatures achieved in the non-imaged areas of the sheet. Thus, by means of controlled exposure, an image-containing original sheet can be made to develop a dominant heat pattern corresponding identically to the distinctive infrared radiation absorption pattern on the imaged original sheet.

After generation of a differential heat pattern on the imaged original sheet, the next step in the thermo-transfer process is to transfer the heat pattern produced from the original by conduction to a suitable transfer material coated on a suitable base. More specifically, transfer of the heat pattern is desirably accomplished by placing the original sheet is conductive relation with the transfer material during the interval in which the original sheet is exposed to infrared radiation. After exposure, the differential heat pattern generated on the original is conducted through any intervening layer to the transfer material.

When direct copies of the original are desired, a copy sheet is intimately contacted with the transfer material. Then a heat pattern is generated on the original sheet and transferred to the waxy transfer material so that selective portions of the transfer material bond to the copy sheet. Production of the copy is thereafter accomplished by separating the non-adhered transfer material on the copy sheet thereby effecting an exact duplication on the copy sheet of the imaged characters or designs carried by the original.

It has been observed that lateral thermal diffusion in the waxy transfer layer degrades image resolution. One reason for this observed resolution degradation is the isotropic character of the dye and wax-containing transfer processes. In short, the dye-wax materials are equally thermally conductive in all directions. Thus, a differential heat pattern generated on the original and transferred to the dye-wax material has a tendency to spread laterally so as to cause blurred images on the final copy or master sheets.

SUMMARY OF THE INVENTION

As a result of the poor image resolution sometimes observed in thermo-transfer processes and particularly in spirit duplicating processes, it has now been discovered that the image resolution problem can be obviated by using a thermally anisotropic dye-wax material capable of high thermal conductivity in a transverse direction and low thermal conductivity in a lateral direction. According to this invention, an anisotropic dye-wax transfer material useful in various thermo-transfer processes can be prepared by dispersing a plurality of thermally conductive particles in a layer of dye-wax transfer material applying an electromagnetic field, i.e. an electrical or magnetic field, to the layer of transfer material while it is in the molten state for a time to align the particles contained therein into positions parallel to the field and transverse to the layer of transfer material. Dispersion and alignment of the particles render the layer of transfer material capable of greater thermal conductivity in the direction transverse to the layer than in the lateral direction of the layer, and as a result, cause images reproduced from the transfer material to have improved resolution and sharpness.

Particles suitable for use in the improved dye-wax transfer material are those which can be aligned by the action of an electromagnetic field and include metals and metal oxides such as copper, silver, iron, nickel, cobalt, iron oxide, nickel oxide, copper oxide, manganese dioxide, and magnesium oxide. Magnetically active particles, such as iron, are caused to align by the action of a magnetic field. Electrically conductive particles, such as silver, however, are aligned by means of an electrical field. In addition, the preferred lateral particles frequency in the dye-wax layer of transfer material is about 10 to 20 particles per millimeter to accomplish effective image resolution through thermo-transfer process techniques.

Among the advantages resulting from the dispersion and orientation of thermally conductive particles in a layer of dye-wax transfer material is improve image resolution for copies made by various thermo-transfer processes employing the improved dye-wax transfer layer. In addition, the improved image resolution is accomplished without the necessity of major process changes and is particularly applicable to known liquid duplicating techniques.

BRIEF DESCRIPTON OF THE DRAWINGS

The invention will be more readily understood by reference to the following drawings in which.

DESCRIPTION OF THE PREFERRED EMBODIMENTS

In general, the thermally anisotropic transfer material of this invention is prepared by mixing thermally conductive particles with the transfer material of wax and dye in a ball mill or the like, under controlled temperature conditions sufficient to melt the transfer material, "melting coating" the mixture of thermally conductive particles and molten transfer material on a substrate and then subjecting the coated material to a perpendicular, electrical or magnetic field, e.g. perpendicular to the direction of the layer of transfer material in order to align the uniformly dispersed particles in a transverse direction with regard to the layer of transfer material and a direction parallel to the direction of the electrical or magnetic field. The electrical or magnetic field is applied for a time sufficient to permit the particle-containing layer of transfer material to cool and solidify.

In addition to rendering the transfer material anisotropic, alignment of the particles by reducing the cross-section presented to incident radiation, reduces infrared absorption by the particles themselves, thereby reducing interference with thermal image formation. For example, when particles are not aligned, infrared radiation is absorbed by the particles and the dye-wax transfer layer may be heated to its melting point before the image on the original is heated. Contrariwise, if the particles are aligned, the transfer material becomes virtually transparent to radiation incident nearly perpendicular to said transfer layer thereby reducing heating effects in the dye-wax layer due to infrared absorption by the particles.

Figure 1:
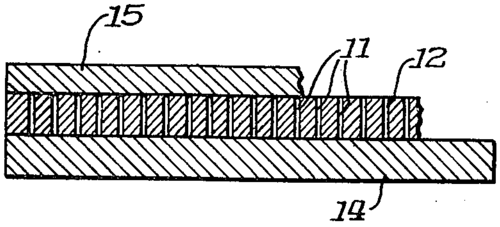
FIG. 1 is a cross-sectional end view of one form of the invention showing a layer of dye-wax transfer material containing uniformly dispersed particles wherein the transfer material coated on a transfer sheet is positioned adjacent to a copy sheet.
Figure 2:
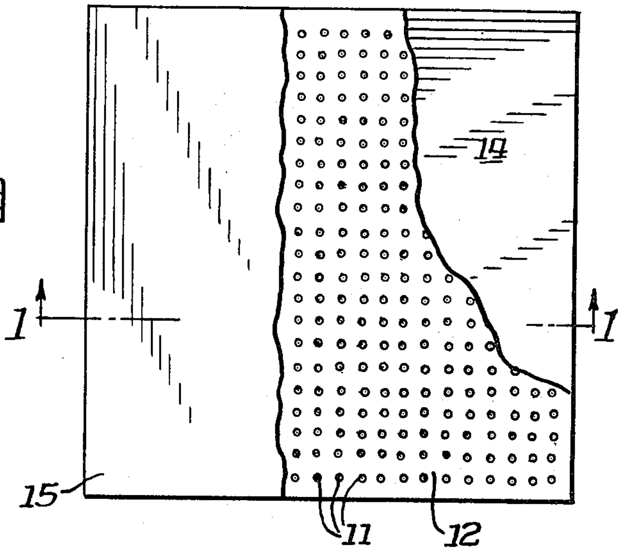
FIG. 2 is an elevational view of the construction shown in FIG. 1 with portions of the transfer material and the copy sheet broken away.

As shown in FIGS. 1 and 2, the thermally anisotropic transfer material of this invention comprises a plurality of thermally conductive particles 11 dispersed in a layer of transfer material 12. Particles 11 are uniformly spaced in transfer material 12 and are oriented perpendicular to the lateral direction of the layer. The dispersed particle-containing layer 12 is coated on a suitable base, the transfer sheet 14. A copy sheet or a duplicating master 15, usually referred to herein as a copy sheet, is placed next to the coating of transfer material 12.

In the thermo-transfer process, the particle-containing layer of transfer material 12 is exposed to a thermal flux produced by preferential absorption of infrared radiation by the black portions of an image-bearing original, e.g. sheet 16 of FIGS. 3–6 described in detail below. During application of the thermal flux, the thermally conductive particles 11 are preferentially heated because of their small diameters and high thermal conductivity. Particles 11 can rapidly attain an elevated temperature because their heat capacity is relatively low and they are surrounded by thermally insulating transfer material 12. Consequently, the entire thickness of the layer of transfer material immediately adjacent to these particles melts quickly so as to transfer images from transfer sheet 14 onto copy sheet 15. Since the aligned particles 11 are spaced and uniformly dispersed throughout layer 12, the thermally transferred image can be readily differentiated and the degradation through lateral spread of the transferred image can be largely prevented.

Although various shapes and sizes of particles can be used in the practice of this invention, long, cylindrical-shaped or needle-shaped particles are found to be particularly suitable in rendering the transfer layer 12 thermally anisotropic, e.g., higher thermal conductivity in a transverse direction than in a lateral direction. It should be understood that the thermally conductive particles should desirably be anisotropic geometrically. Preferably, the ratio of the length of particles 11 to their diameter will be at least 2:1. For example, particle lengths should be less than 0.5 mils and preferably between 0.40 and 0.45 mils, if the layer thickness is 0.5 mils, which is normal for commercial transfer materials. Smaller particles can be used in the practice of this invention, however, since the application of electrical or magnetic fields cause smaller particles to move together into a continuous chain. In addition, the spacing of particles 11 in transfer layer 12, e.g., lateral particle frequency, is desirably equivalent to at least about 10 particles per millimeter to accomplish high resolution copying in thermo-transfer processes. Preferably, however, the lateral particle frequency is about 10 to 20 particles per millimeter.

The preferred transfer material useful in this invention is a combination dye and wax material. This dye-wax transfer material is desirably a kind which is stable at normal handling temperatures to about 110° F. and at atmospheric pressures, but is capable of being rendered plastic at temperatures above about 110° F. at atmospheric pressures. Although any thermally conductive material can be used for particles 11, metals and metal oxides, such as copper, iron, silver, nickel, cobalt, iron oxide, and magnesium oxide are preferred in the practice of this invention. When magnetic particles, such as iron, are used, alignment is accomplished by means of a magnetic field. In contrast, when electrically conductive particles, such as silver or copper, are used, an electrical field is employed to align the particles.

It should be understood, however, that electrically insulating particles, such as magnesium oxide, can also be used in the practice of this invention. In fact, magnesium oxide has other properties which are deemed to make it the presently preferred material for the anisotropic particles. Magnesium oxide particles are highly reflective, thereby lowering absorption of infrared radiation in the thermal transfer layer and consequently avoiding temperature increase in the layer; the particles have good heat conductivity thereby speeding up imagewise conduction of the heat pattern in the direction of particle alignment through the transfer layer.

The term plastic, as used herein, describes a condition of the transfer material softening that permits adhesion or intermingling between the transfer material and adjacent contacting surfaces. The term isotropic, as used herein, refers to the characteristic of a material, e.g., transfer layer 12, to exhibit the same value of a physical property, e.g., thermal conductivity, on axes in all directions. The term anisotropic, in contrast, refers to the characteristic of a material, e.g., transfer layer 12, to exhibit different values of a physical property, e.g., thermal conductivity, on axes in different directions.

In addition to being rendered plastic at temperatures above about 110°F, it is desirable that the transfer material used for making facsimile copy should be relatively "hard" so that the copy prepared therewith will not be subject to smearing during the course of normal handling. The transfer material used in preparing lithographic masters should also be relatively hard so as to withstand the impression pressures to which the master sheet is subjected during each of its duplication cycles. Moreover, the transfer used in preparing solvent duplicating master sheet should desirably be applied to its paper base stock in relatively thick quantities to provide a master sheet capable of producing a multiplicity of copies, and the composition of the material must be such as to effect a sharp pull out of a well-delineated plug of transfer material from the supply sheet which forms the image. These and other parameters for the dye-wax layer of transfer material used in this invention are set forth in the aforementioned U.S. Pat. Nos. 3,122,997 and 3,122,998.

The composition of the dye-wax transfer material used in the practice of this invention, of course, varies according to the specific thermo-transfer process for which it is used. Typically, a formulation of wax, dye and oil is used as the dye-wax transfer material. Waxes suitable for use include naturally occurring waxes selected from the group consisting of petroleum based wax, such as paraffin wax, vegetable wax, such as Carnauba, animal wax, such as spermaceti wax, insect wax, such as beeswax, and mined wax, such as montan wax. In addition, various synthetic waxes, such as carbwax, can be used in the dye-wax transfer material formulation.

As in the case of waxes, the dyes used in the dye-wax transfer materials also depend upon the particular thermo-transfer process employed. The preferred dyes used in the spirit-type duplicating process are water-alcohol soluble type dyes selected from the group of xanthene dyes, such as triphenyl methane and diphenyl methane derivatives typified by crystal violet, methyl violet, rhodamine and nitrosene dyes. Included in the group of dyes suitable for use, the preparation of facsimile copy and lithographic masters are the oil soluble dyes, such as Azo dyes, e.g., Azo Oil Blue B.

The various oils used in the dye-wax transfer material. compositions serve as a plasticizer for the compositions and are absorbed by the dyes. The oils that have been found to give the proper absorbency and plasticity characteristics are selected from the group of mineral oils, such as saturated mineral oils, for example, Red Z oil, from the group of unsaturated vegetable oils, such as castor oils and from the group of animal oils, such as lanolin. In the exemplary formulations in which the group of mineral oils are in major proportion and the groups of unsaturated vegetable oils and animal oils are in minor proportion are best suited to the purpose of this invention and for that reason the groups are referred to as "Major Oils" and "Minor Oils", respectively.

The specific formulations and coating condition of a particular mixture depend upon its usage, and at present there are considered four basic types of master sheets as follows:

1. For solvent type duplication by the shoot-through technique;
2. For solvent type duplication by the reflex technique;
3. For lithographic master sheet preparation by both shoot-through and reflex techniques; and
4. For the preparation of facsimile copies by both shoot-through and reflex techniques.

These and other types of thermo-transfer processes disclosed in the aforementioned U.S. Pat. Nos. 3,122,997 and 3,122,998 can be used in this invention to improve image resolution.

Considering first the master sheets employed for solvent type duplication by shoot-through technique and the master sheets for the solvent type duplication using the reflex technique, in each case the layer of the transfer composition must be of a definite, uniform thickness and present a very smooth surface in order to make complete, intimate contact with the surface to which transfer is to be effected. The formulations of the composition for both the spirit type duplicating master sheets for use with the shoot-through technique and the spirit type duplicating master sheets for use with the reflex technique are essentially the same, the main difference between these two types of master sheets being in thicknesses of the composition layers employed and the different types of support sheet employed.

The dyes used in the formulations for the transfer compositions of the spirit duplicating type are alcohol soluble, non-infrared absorbing dyes, having specific oil absorption characteristics which permit these dyes to be dispersed and distributed homogeneously into an oil or wax base vehicle. The oil absorption characteristic is determined on the basis of the quantity of oil that can be uniformly absorbed by a given quantity and kind of dye. For crystal violet dye, a practical maximum oil absorption characteristic (Gardner-Holman method) is a milliliter of oil per 5 grams of dye. In this circumstance, it means that 5 grams or less of crystal violet dye can be evenly dispersed and distributed in a milliliter of oil but that if a greater quantity of dye is inserted in a milliliter of oil, the dispersement and distribution of that dye would not be uniform. It has been found, as disclosed hereinafter, that in the formulations of transfer material for solvent type duplication usage, the total weight of dye as to other constituents in the formulation may range between 20% and 65%, the upper limit being determined by the amount of oil used in the formulation and the oil absorption characteristics of the particle dye used. The preferred dyes for this invention do not absorb infrared radiation and have been found to include crystal violet, as previously mentioned, nigrosine and methyl violet.

It has been found that these dyes with waxes selected from the group of natural waxes including paraffin wax, microcrystalline and ceresin wax, natural mined waxes including montan and ozokerite, and natural vegetable waxes including carnauba, candelilla, Japan wax, flax wax and sugar can wax and oils including mineral oil, castor oil and lanolin, can be combined under precise conditions and formulations to give a transfer material having the desired properties of plasticity permitting localized adherence or cementation with a contacting surface and permitting mechanical disruption of the layer of transfer material so that there can occur a release and transfer of a discrete plug of the composition from its layer to its contacting master sheet by use in the infrared transfer process. In this formulation, it is not necessary, and actually it is not preferred, that the composition should attain a liquid state in effecting this unique kind of material transfer wherein a plug of the material is transferred from this supply sheet. While it is not completely understood, it can be shown that the specific wax blends play a most significant part in effecting the characteristic of localized cementation which must necessarily occur before there can be any mechanical disruption and which is critical to achieving a discrete and exact transfer of the transfer material from the supply sheet to the master sheet.

A more specific disclosure of various acceptable dye-wax transfer material formulations is contained in U.S. Pat. Nos. 3,122,997 and 3,122,998. By way of example, however, a range of acceptable mixtures of wax to major to minor oil for spirit type duplicating formulations where dye content is 20% by weight is illustrated below:

| | Percent (Wt.) |
|---|---|
| Wax | 80±15 |
| Major Oil | 20±15 |
| Minor Oil | 0±15 |

An actual formulation mixture is:

| | Percent (Wt.) |
|---|---|
| Wax: | |
| Microcrystalline (Cardis wax 262) | 88 |
| Candellila | 2 |
| Major Oil: | |
| Mineral Oil (Red Z Oil) | 10 |
| Minor Oil | 0 |

The dye employed in the above formulation is crystal violet.

Another illustration of the dye-wax transfer material formulations useful in the practice of this invention is given below:

| | Percent (Wt.) |
|---|---|
| Wax | 50±15 |
| Major Oil | 30±15 |
| Minor Oil | 20±15 |

The mixture in an actual formulation is as follows:

| | Percent (Wt.) |
|---|---|
| Wax: | |
| Carnauba | 44 |
| Major Oil: | |
| Mineral Oil (Red Z Oil) | 40 |
| Minor Oil: | |
| Castor Oil | 12 |
| Lanolin | 4 |

wherein the mixture of dyes employed is 90% crystal violet and 10% methyl violet and the total dye content of the formulation is 50% by weight. This dye-wax transfer material formulation attains a condition of plasticity at a temperature of about 143° F.

In order to disperse the thermally conductive particles in the above dye-wax transfer material, particles, such as iron oxide, nickel, copper, silver, iron, nickel oxide, cobalt, magnesium oxide, or the like, are dispersed in the wax formulation simultaneous with the addition of dye. Sufficient particles are added to the wax to achieve an overall particle frequency of 10 to 20 particles per millimeter of transfer material length. Next, all three components, wax, dye and particles, are ball milled together at temperatures sufficient to render the transfer material molten. Thereafter, the mixture of components are passed through a plastic roll mill to further homogenize the mixture. This homogeneous mixture is then melt coated on a suitable substrate. Immediately thereafter, a magnetic or electrical field sufficient to orient the dispersed particles is applied to the coating while it is still in the molten state and is maintained for a time sufficient to permit the coating to cool and solidify. The particles in the molten dye-wax layer will align parallel to the field and thereby be aligned perpendicular to the two lateral film directions.

Figure 3:
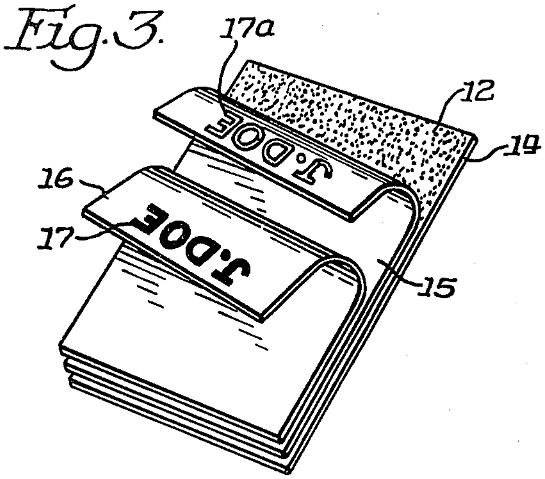
FIGS. 3 and 4 are diagrammatic representations of one assemblage useful in the practice of thermo-transfer processes.
Figure 4:
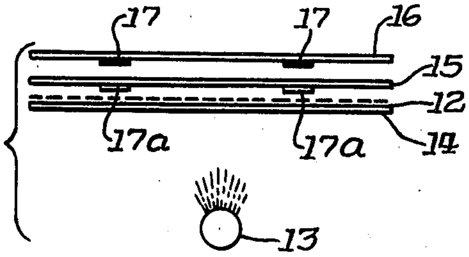

An assemblage used for producing direct reading images by a reflex technique is illustrated in FIGS. 3 and 4. Transfer sheet 14 is placed nearest to an infrared light source 13. The upper surface of transfer sheet carries a 0.5 mil thick layer of dye-wax transfer material 12 containing aligned particles 11 dispersed therein. A copy sheet 15 is placed in contiguous relationship with the layer of transfer material 12. Finally, original sheet 16 carrying images 17 facing light source 13 is placed on top of copy sheet 15. When light source 13 is activated, the transfer image 17*a* is locally cemented onto the surface of the copy sheet 15 to form a direct reading image.

Through the use of appropriate transfer sheets 14 and copy sheet 15, this assemblage can be used to prepare a facsimile copy or an offset lithographic master sheet.

Figure 5:
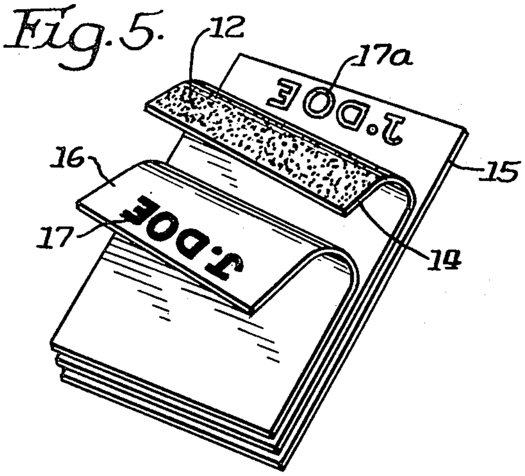
FIGS. 5 and 6 are diagrammatic representations of another assemblage for use in thermo-transfer processes.
Figure 6:
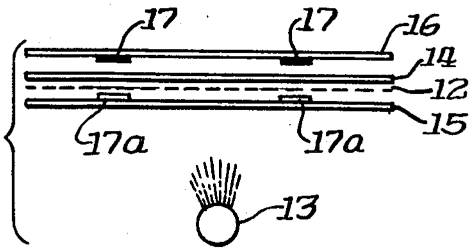

Another assemblage is shown in FIGS. 5 and 6 in which the so-called "reflex" technique is used. A reverse-reading image 17*a* can be obtained by reversing the copy sheet 15 and the transfer sheet 14 of the FIG. 4 assemblage so that the transfer sheet 14 is adjacent to the images 17 on the original sheet 16 with transfer layer 12 still facing the copy sheet 15. In the same manner as in FIG. 4, radiation from an infrared source 13, placed below the assemblage, is directed through the assemblage to the images 17 where it is absorbed to produce a heat pattern which is conducted through the transfer backing sheet 14 to the transfer layer 12. This assemblage can be used to produce a hectograph or spirit duplicating master.

The use of dispersed thermally conductive particles 11 in the layer of transfer material, of course, is to improve the resolution of images transferred from original 15 to transfer sheet 14. Improved image resolution is believed to result from the fact that the dispersed particles in the layer of dye-wax transfer material render the dye-wax layer thermally anisotropic, e.g., higher thermal conductivity in transverse direction of layer than in lateral direction of layer; and thus allows high differentiation of the transferred image.

It should be recognized that many of the thermally conductive and electromagnetic particles described herein are black in finely divided form. Since the particles are aligned in the transfer layer, the overall light transmission capability of the layer is relatively high. During the thermal imaging process, however, transfer material melts and flows. As a result, the particles tend to randomize or lose the anisotropic orientation during the thermal imaging process and the master image will appear to be very black due to a reduction of light transmission which may be as great as 50 to 100 times. Accordingly, when a single fax copy is made, the presence of dye in the transfer layer is not required. A wax layer, for example, containing aligned, geometrically anisotropic black particles such as ferric oxide, can be thermally imaged to produce a copy directly on plain paper, in one step, employing either a shoot-through or reflex technique. If higher quality copies are desired, independent of variations in paper thickness, of original substrate light transmission characteristics and of copy paper substrate, a reverse reading reflex master can be made and then transferred to plain paper with the mere application of heat and/or pressure. This latter technique is capable of producing more than one copy if not all the material on the master is transferred at once.

The embodiments of the invention in which an exclusive property or privilege is claimed are defined as follows:

1. In a process for producing radiation absorbing images disposed on the surface of an original the steps of disposing a sandwich comprising a thermally anisotropic transfer sheet having a layer of transfer material thereon and a copy sheet in heat transfer relation to said original, said transfer material having a plurality of thermally conductive particles dispersed therethrough and oriented in a predetermined relationship with respect to other portions of said transfer material with a greater thermal conductivity in a direction perpendicular to the surface of said transfer sheet than in a parallel direction, exposing said images on said original to radiant energy sufficient to generate a heat pattern thereon, preferentially heating said particles and transferring said heat pattern to said layer of transfer material whereby said transfer material is transferred and adhered to said copy sheet in a pattern corresponding to said heat pattern.

2. The process of claim 1 wherein said transfer material contains a plurality of uniformly dispersed thermally conductive, electromagnetic particles.

3. The process of claim 2 wherein said electromagnetic particles are selected from the group consisting of copper, silver, iron, nickel, cobalt, iron oxide, copper oxide, manganese dioxide, nickel oxide and magnesium oxide.

4. The process of claim 2 wherein said particles are geometrically anisotropic.

5. The process of claim 2 wherein said transfer material is a composition comprising dye, wax and an oil.

6. The process of claim 2 wherein the lateral frequency of said particles contained in said transfer layer is at least 10 particles per millimeter.

7. The process of claim 1 wherein said transfer material has greater optical transparency in said perpendicular direction than in said parallel direction.

* * * * *